(12) United States Patent
Wyne et al.

(10) Patent No.: US 9,574,845 B1
(45) Date of Patent: Feb. 21, 2017

(54) HUNTING SCENT AND CALL PNEUMATIC GUN

(71) Applicants: Robert Wyne, Ocean City, MD (US); Rosemary Corbey, Ocean City, MD (US)

(72) Inventors: Robert Wyne, Ocean City, MD (US); Rosemary Corbey, Ocean City, MD (US)

( * ) Notice: Subject to any disclaimer, the term of this patent is extended or adjusted under 35 U.S.C. 154(b) by 0 days.

(21) Appl. No.: 15/040,844

(22) Filed: Feb. 10, 2016

(51) Int. Cl.
*F41B 11/80* (2013.01)
*A01M 31/00* (2006.01)
*F41B 11/62* (2013.01)
*F41B 11/723* (2013.01)

(52) U.S. Cl.
CPC ............. *F41B 11/80* (2013.01); *A01M 31/004* (2013.01); *A01M 31/008* (2013.01); *F41B 11/62* (2013.01); *F41B 11/723* (2013.01)

(58) Field of Classification Search
CPC ........... F41B 11/00; F41B 11/62; F41B 11/70; F41B 11/80; F41A 21/46; A01M 31/00; A01M 31/004; A01M 31/008; A01K 15/02; A01K 15/021; A01K 29/00
USPC .... 124/71–77; 43/1; 89/14.5, 14.6; 119/174, 119/712, 719
See application file for complete search history.

(56) References Cited

U.S. PATENT DOCUMENTS

| | | | | |
|---|---|---|---|---|
| 2,409,653 A * | 10/1946 | Amdur | ..................... | F41B 11/89 124/37 |
| 2,868,078 A * | 1/1959 | Jarrett | ..................... | F41A 21/30 181/223 |
| 3,087,481 A * | 4/1963 | Foster | ................... | F41B 9/0034 124/27 |
| 3,448,541 A * | 6/1969 | Barlow | ..................... | A63H 5/00 401/195 |
| 5,033,446 A * | 7/1991 | Bradt | ..................... | A01K 15/00 124/21 |
| 5,303,496 A * | 4/1994 | Kowalkowski | ......... | F42B 12/36 124/54 |
| 5,456,036 A * | 10/1995 | Butz | ................... | A01M 31/008 124/26 |
| 6,199,311 B1 * | 3/2001 | Foster | ................. | A01M 31/008 102/506 |
| 6,318,350 B1 * | 11/2001 | Williams | .............. | A01M 31/00 124/71 |
| 6,783,422 B1 * | 8/2004 | Bean | .................... | A01M 31/004 446/202 |
| 7,305,788 B1 * | 12/2007 | McLain | .................. | F41A 21/32 42/1.08 |
| 7,334,541 B2 * | 2/2008 | Reiter | .................... | A01K 15/02 119/712 |
| 7,603,998 B2 * | 10/2009 | Finstad | ................... | F41A 21/32 124/73 |

(Continued)

*Primary Examiner* — Jonathan C Weber
(74) *Attorney, Agent, or Firm* — Quickpatents, LLC; Kevin Prince

(57) ABSTRACT

A gun for propelling a projectile, such as a scent compound enclosed in an spherical shell, into a hunting environment comprises a frame housing a compressed gas reservoir in fluid communication with a trigger valve that is operatively associated with a manually-actuable trigger to momentarily open the trigger valve. A projectile barrel and a sound barrel are each in fluid communication with the compressed gas reservoir when the trigger valve is open. The sound barrel includes a pneumatic game call. The pneumatic game call is selectively removable from the sound barrel and replaceable with at least one other pneumatic game call that produces a different game call. A distal end of the projectile barrel preferably includes a plurality of scoring blades fixed therewithin, such that upon exiting the projectile barrel the shell of the projectile is scored by the scoring blades.

14 Claims, 4 Drawing Sheets

(56) References Cited

U.S. PATENT DOCUMENTS

| | | | | |
|---|---|---|---|---|
| 8,770,179 | B2* | 7/2014 | Haynes | F41A 21/32 |
| | | | | 124/56 |
| 8,800,419 | B1* | 8/2014 | Walker | F41A 21/36 |
| | | | | 89/14.3 |
| 9,004,013 | B2* | 4/2015 | Bianchi | A01K 15/02 |
| | | | | 119/51.01 |
| 2003/0034019 | A1* | 2/2003 | Lewis | F41B 3/02 |
| | | | | 124/20.1 |
| 2006/0191525 | A1* | 8/2006 | Dai | F41A 21/32 |
| | | | | 124/83 |
| 2007/0224908 | A1* | 9/2007 | Vaught | A01M 31/004 |
| | | | | 446/213 |
| 2008/0092426 | A1* | 4/2008 | Modlin | A01M 31/008 |
| | | | | 43/1 |
| 2008/0099581 | A1* | 5/2008 | Modlin | A01M 31/008 |
| | | | | 239/332 |
| 2008/0313947 | A1* | 12/2008 | Fachner | A01M 31/008 |
| | | | | 43/1 |
| 2009/0266262 | A1* | 10/2009 | Vasel | F42B 7/08 |
| | | | | 102/370 |
| 2009/0320815 | A1* | 12/2009 | Bunker | A01M 1/02 |
| | | | | 124/1 |
| 2010/0192930 | A1* | 8/2010 | Lammonds | F41B 11/62 |
| | | | | 124/74 |
| 2011/0271573 | A1* | 11/2011 | Vielbig | F41A 21/28 |
| | | | | 42/1.01 |
| 2013/0192119 | A1* | 8/2013 | Zimmerman | A01M 31/008 |
| | | | | 43/2 |

* cited by examiner

HUNTING SCENT AND CALL PNEUMATIC GUN

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to hunting, and more particularly to a scent-distributing gun.

DISCUSSION OF RELATED ART

Distributing a scented attractant within a hunting environment is known in the art, and one effective method of delivering such a scented compound is through the use of a pneumatic gun, such as a paint-ball gun that shoots a spherical projectile that contains the scented compound within a breakable shell. For example, U.S. Pat. No. 6,199,311 to Foster on Mar. 13, 2001 teaches such a device.

At least two problems arise with the use of such a prior art device. First, sometimes the scent ball or projectile does not rupture upon contacting objects within the hunting environment, resulting in waste as a subsequent projectile must be used. U.S. Pat. No. 7,603,998 to Finstad on Oct. 20, 2009 teaches using a sharp edge or blade to score a paintball to promote rupturing of the paintball when contacting a target. Such a product might be useful to score a scent-laden projectile in a similar manner, but the Finstad device is primarily concerned with imparting spin on the projectile for shooting targets obscured by obstacles, which is not desired when simply trying to deliver a scented attractant to a hunting environment.

Second, the significant noise of compressed gas propelling a projectile can often scare away the very game the hunter is trying to attract. None of the prior art devices include a means for masking such a sound when using a pneumatic gun to deliver a scent ball or projectile.

Therefore, there is a need for a device that allows a hunter to fire a scent-laden projectile into a hunting environment to attract game. Such a needed device would provide for scoring of the projectile in a symmetric manner to reduce spin of the projectile and thereby increase accuracy, yet while promoting rupturing of the scent ball upon contact with objects in the hunting environment. Further, such a needed invention would provide a pneumatic game call that sounds simultaneously with the firing of the projectile in order to mask the sound of the gun firing the projectile. Such a needed device would be relatively easy to manufacture, use and store. The present invention accomplishes these objectives.

SUMMARY OF THE INVENTION

The present device is a gun for propelling a projectile into a hunting environment. The projectile is of the type encapsulating a scent compound within a liquid-impervious spherical shell.

The gun comprises a frame housing a compressed gas reservoir in fluid communication with a trigger valve that is operatively associated with a manually-actuable trigger that momentarily opens the trigger valve. A projectile barrel and a sound barrel are each in fluid communication with the compressed gas reservoir when the trigger valve is open. The sound barrel includes a pneumatic game call.

In use, with the projectile loaded into the projectile barrel, upon actuating the trigger to open the trigger valve, a portion of the compressed gas propels the projectile through the projectile barrel and another portion of the compressed gas exists the sound barrel through the pneumatic game call to produce an attractive noise that at least partially obscures the sound of the projectile and compressed gas leaving the projectile barrel. The shell of the projectile, upon striking the hunting environment, breaks to release the scent compound within the hunting environment.

Preferably the pneumatic game call is selectively removable from the sound barrel and replaceable with at least one other pneumatic game call that produces a different game call or attractive noise. A distal end of the projectile barrel preferably includes a plurality of scoring blades fixed therewithin, such that upon exiting the projectile barrel the shell of the projectile is scored by the scoring blades, such that the projectile is more prone to rupture upon subsequent impact of the projectile with the hunting environment.

The present invention allows a hunter to fire a scent-laden projectile into a hunting environment to attract game, and provides for scoring of the projectile in a symmetric manner to reduce spin of the projectile and thereby increase accuracy, while promoting rupture of the scent ball upon contact with objects in the hunting environment. Further, the present device provides a pneumatic game call that sounds simultaneously with the firing of the projectile in order to mask the sound of the gun firing the projectile. The present invention is relatively easy to manufacture, use and store. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
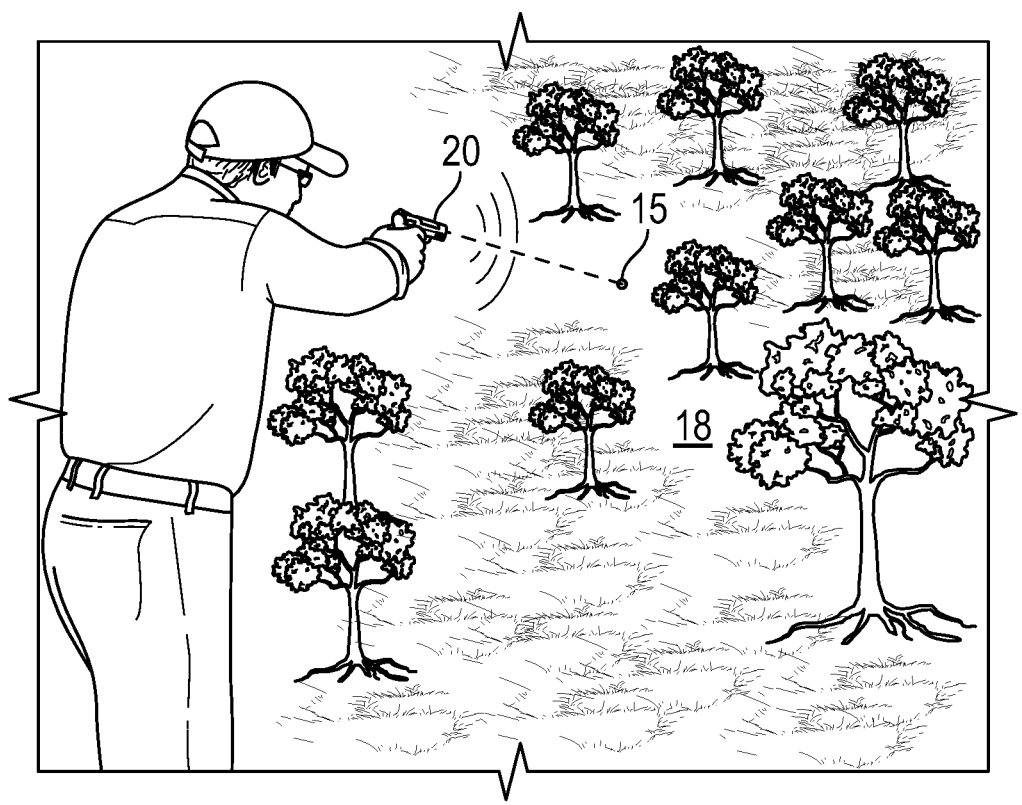
FIG. 1 is a perspective view of the invention as used to propel a projectile into a hunting environment.
Figure 2:
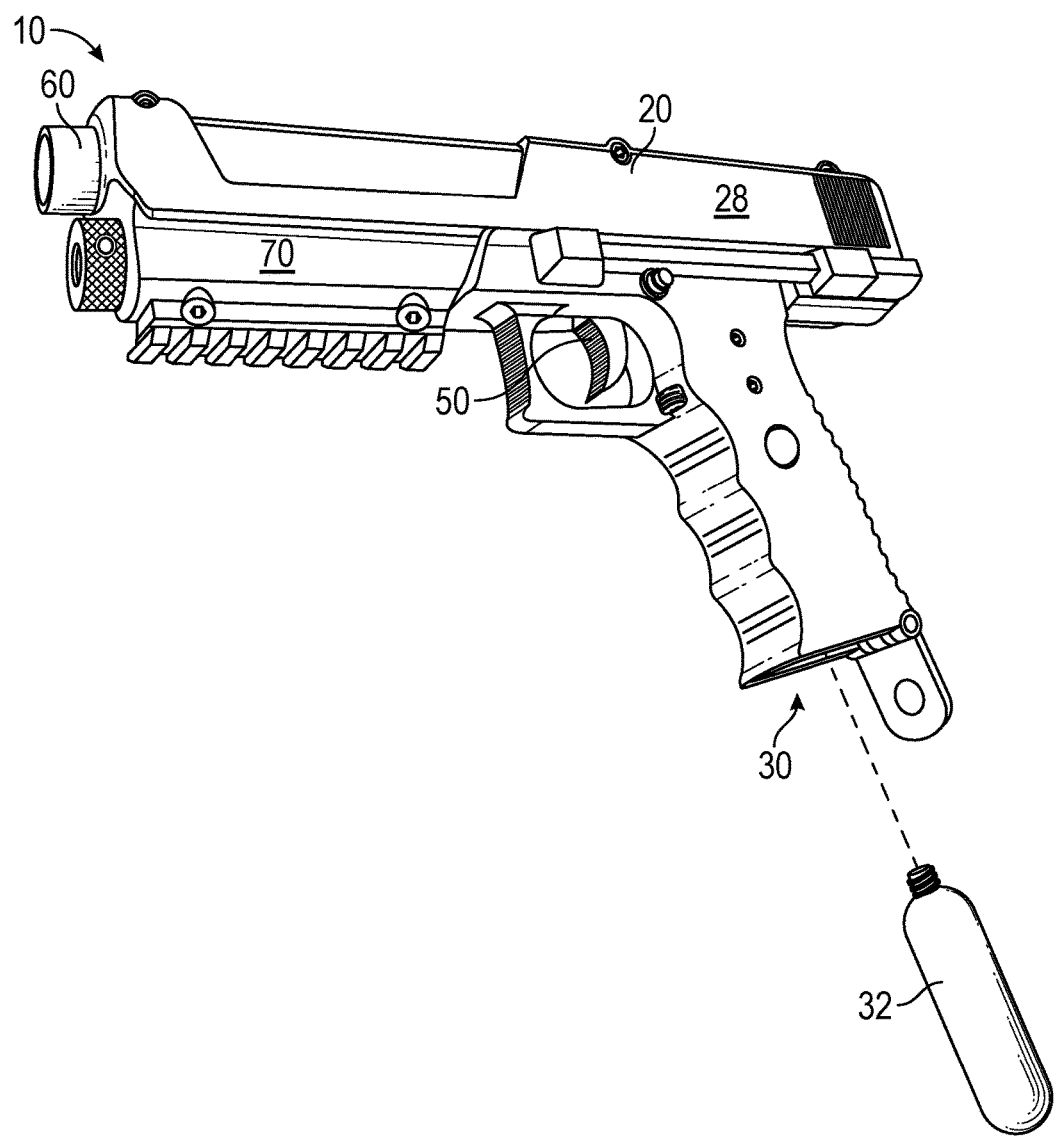
FIG. 2 is an exploded view of the invention, illustrating a removable $CO_2$ cartridge.
Figure 3:
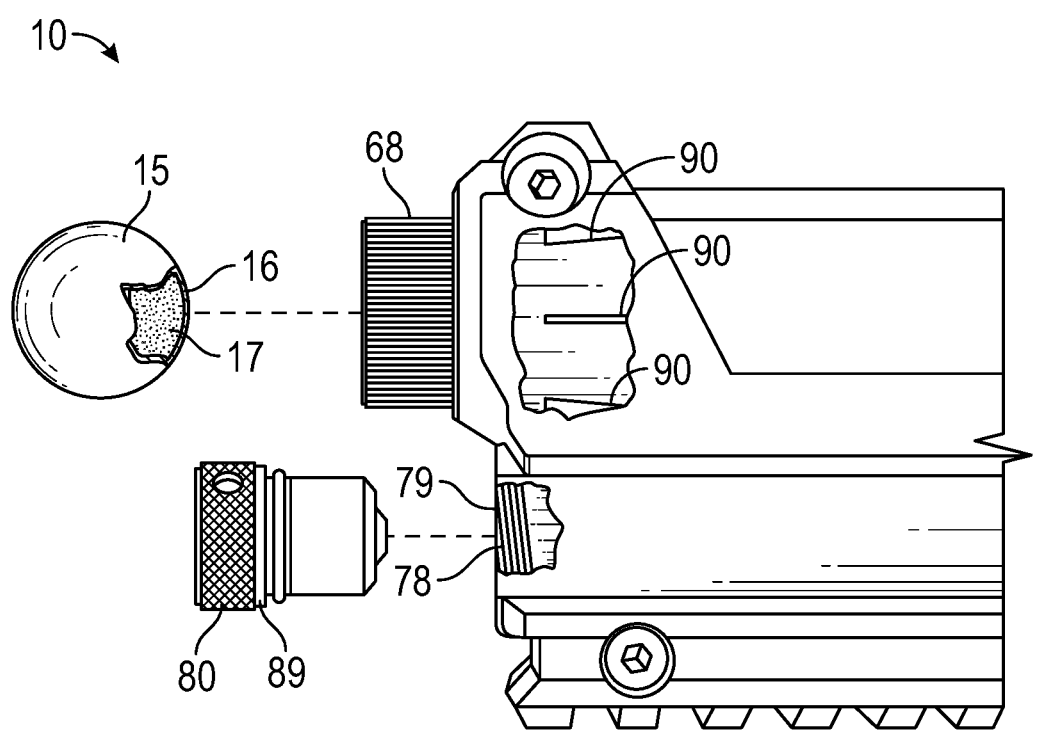
FIG. 3 is a partial exploded side elevational view of the invention, partially cut-away, of distal ends of a projectile barrel and a sound barrel.

FIGS. 1 and 2 illustrate a gun 10 for propelling a projectile 15 into a hunting environment 18. The projectile 15 is of the type encapsulating a scent compound 17, such as a game attractant, within a liquid-impervious spherical shell 16.

The gun 10 comprises a frame 20 housing a compressed gas reservoir 30, preferably a removable $CO_2$ cartridge 32, that is in fluid communication with a trigger valve 40 that is operatively associated with a manually-actuable trigger 50 that momentarily opens the trigger valve 40. A projectile barrel 60 and a sound barrel 70 are each in fluid communication with the compressed gas reservoir 30 when the trigger valve 40 is open. The sound barrel includes a pneumatic game call 80. Preferably the frame 20 takes the form of a pistol, includes a camouflaged outer surface 28, and is made from a milled metallic material, a cast metallic material, or a rigid plastic molded material.

In use, with the projectile 15 loaded into the projectile barrel 60, upon actuating the trigger 50 to open the trigger valve 40, a portion of the compressed gas propels the projectile 15 through the projectile barrel 60 and another portion of the compressed gas exists the sound barrel 70 through the pneumatic game call 80 to produce an attractive noise that at least partially obscures the sound of the projectile 15 and compressed gas leaving the projectile barrel 60. The shell 16 of the projectile 15, upon striking the hunting environment 18, breaks to release the scent compound 17 within the hunting environment 18.

Figure 4:
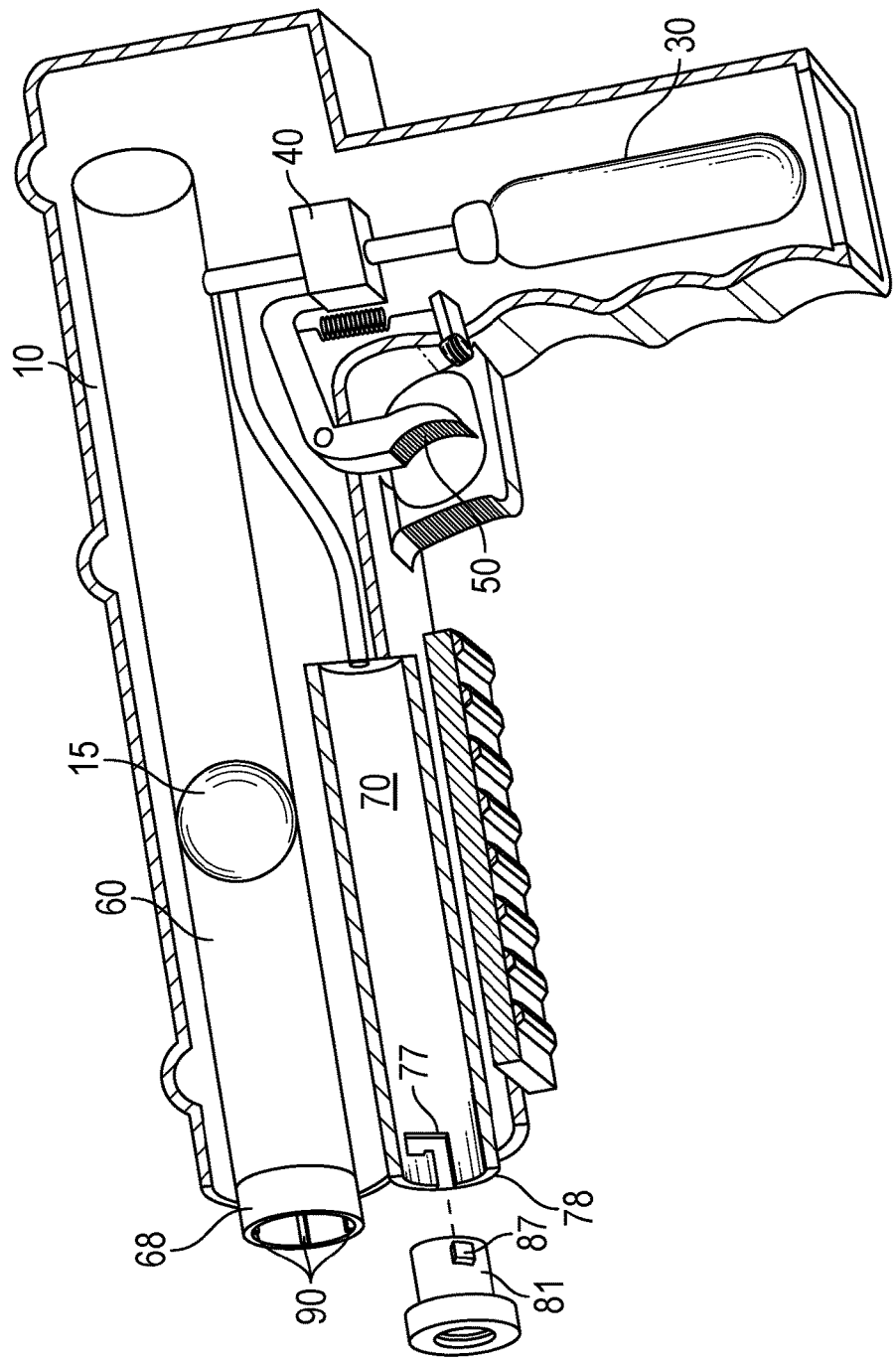
FIG. 4 is a diagram of a gas pathway between the removable $CO_2$ cartridge and the distal ends of the projectile barrel and the sound barrel.

Preferably the pneumatic game call 80 is selectively removable from the sound barrel 70 and replaceable with at least one other pneumatic game call 80 that produces a different game call or attractive noise. Preferably the game call 80 includes a plurality of outer threads 89 cooperative with threads 79 formed within a distal end 78 of the sound barrel 70, such that each game call 80 may be fixed or screwed into the distal end 78 of the sound barrel 70. Alternately, the game call 80 includes at least one projecting tab 87 (FIG. 4) cooperative with at least one recessed slot 77 formed within the distal end 78 of the sound barrel 70, such that each game call 80 may be inserted and rotated to secure the game call 80 to the sound barrel 70. As such, depending on the type of game desired and to which the scent compound 17 is directed, the appropriate game call 80 may be used in the gun 10.

A distal end 68 of the projectile barrel 60 preferably includes a plurality of scoring blades 90 fixed therewithin, such that upon exiting the projectile barrel 60 the shell 16 of the projectile 15 is scored by the scoring blades 90, such that the projectile 15 is more prone to rupture upon subsequent impact of the projectile 15 with the hunting environment 18. Such a plurality of scoring blades 90, such as four scoring blades 90, form a symmetric pattern about the longitudinal axis of the projectile barrel 60 so as to promote an accurate trajectory of the projectile 15 by inhibiting spin of the projectile 15 when leaving the projectile barrel 60.

While a particular form of the invention has been illustrated and described, it will be apparent that various modifications can be made without departing from the spirit and scope of the invention. For example, while a pistol form of the frame 20 is shown in the figures, the gun 10 could take the form of a riffle, shotgun, or other projectile shooting device. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A gun for propelling a projectile into a hunting environment, the projectile of the type encapsulating a scent compound within a liquid-impervious spherical shell, the gun comprising:

a frame housing a compressed gas reservoir in fluid communication with a trigger valve operatively associated with a manually-actuable trigger to momentarily open the trigger valve, a projectile barrel and a sound barrel each in fluid communication with the compressed gas reservoir when the trigger valve is open, the sound barrel including a pneumatic game call;

whereby with the projectile loaded into the projectile barrel, upon actuating the trigger to open the trigger valve, a portion of the compressed gas propels the projectile through the projectile barrel and another portion of the compressed gas exits the sound barrel through the pneumatic game call to produce an game call noise that at least partially obscures the sound of the projectile and compressed air leaving the projectile barrel, the shell of the projectile upon striking the hunting environment breaking to release the scent compound within the hunting environment.

2. The gun of claim 1 wherein the game call is selectively removable from the sound barrel.

3. The gun of claim 2 further including at least one other pneumatic game call, whereby each game call may be removed from the gun and replaced with the at least one other game call.

4. The gun of claim 3 wherein each game call produces a unique game call noise when the compressed gas is forced therethrough.

5. The gun of claim 2 wherein the game call includes a plurality of outer threads cooperative with threads formed within a distal end of the sound barrel, such that each game call may be fixed or screwed into the distal end of the sound barrel.

6. The gun of claim 2 wherein the game call includes at least one projecting tab cooperative with at least one recessed slot formed within a distal end of the sound barrel, such that each game call may be inserted and rotated to secure the game call to the sound barrel.

7. The gun of claim 2 wherein the frame is made from a rigid plastic material.

8. The gun of claim 2 wherein the frame is made from a cast metallic material.

9. The gun of claim 2 wherein the frame is made from a milled metallic material.

10. The gun of claim 1 wherein a distal end of the projectile barrel includes a plurality of scoring blades fixed therewithin, such that upon exiting the projectile barrel the shell of the projectile is scored by the scoring blades, whereby the projectile is more prone to rupture upon subsequent impact of the projectile with the hunting environment.

11. The gun of claim 10 wherein the scoring blades within the projectile barrel form a symmetric pattern about a longitudinal axis of the barrel.

12. The gun of claim 10 wherein the plurality of scoring blades is exactly four scoring blades.

13. The gun of claim 1 wherein the compressed gas reservoir is a removable $CO_2$ cartridge.

14. The gun of claim 1 wherein the frame takes the form of a pistol and includes a camouflaged outer surface.

* * * * *